United States Patent

Greene et al.

[11] Patent Number: 6,131,395
[45] Date of Patent: Oct. 17, 2000

[54] PROPELLANT DENSIFICATION APPARATUS AND METHOD

[75] Inventors: William Duncan Greene; Miranda Leigh Anthony, both of Huntsville, Ala.

[73] Assignee: Lockheed Martin Corporation, New Orleans, La.

[21] Appl. No.: 09/275,836

[22] Filed: Mar. 24, 1999

[51] Int. Cl.$^7$ ....................................... F25B 19/00
[52] U.S. Cl. ................... 62/7; 62/46.1; 62/47.1
[58] Field of Search ................. 62/7, 46.1, 47.1

[56] References Cited

U.S. PATENT DOCUMENTS 3,473,343  10/1969  Chamberlain ............................ 62/46.1
5,644,920  7/1997  Lak et al. ................................. 62/47.1

*Primary Examiner*—Ronald Capossela
*Attorney, Agent, or Firm*—W. H. Meise

[57] ABSTRACT

A method for densifying the LO2 propellant of a vehicle (10) includes providing a heat exchanger (16) including a chamber (22), and an isolated heater (24) and cooler (26) located within the chamber (22). The method further includes the step of pumping propellant (LO2) (with pump 14) from the vehicle (10) to the first port (24$i$) of the path of the heater (24), to thereby create a flow of propellant (LO2) through the heater (24) path, and from the second port (24$o$) of the path of the heater (24). In conjunction with the pumping, propellant (LO2) is coupled from the second port (24$o$) of the heater (24) back to the vehicle (10), to thereby establish a recirculating flow of propellant (LO2). The chamber (22) of the heat exchanger (16) is filled with at least sufficient cryogenic liquid (LN2) to cover at least a portion of the path of the cooler (26), and preferably the entirety of the path of the cooler (26). A cryogenic fluid (LH2) is boiled, to thereby cool the cryogenic fluid, and the resulting cooled cryogenic fluid is flowed through the path of the cooler (26). As a result, or whereby, the flow of the cooled cryogenic fluid through the cooler (26) cools the cryogenic liquid, and the cryogenic liquid cools the heater (24) by convection (60). When the cryogenic liquid cools the heater (24), the cryogenic propellant (LO2) flowing through the heater (24) gives up heat to the cryogenic liquid and becomes cooler (26), thereby densifying the cryogenic propellant (LO2).

4 Claims, 1 Drawing Sheet

PROPELLANT DENSIFICATION APPARATUS AND METHOD

FIELD OF THE INVENTION

This invention relates to the densification of propellant for a launch or space vehicle in order to increase the fuel or oxidizer mass carried aboard the vehicle.

BACKGROUND OF THE INVENTION

The densification of propellant (fuel, oxidizer, or monopropellant) by chilling is used in the launch-vehicle arts. Liquid oxygen (LOX) is one of the common propellants.

In the simplest type of propellant loading, a flow of cryogenic propellant is provided to the propellant tank of the vehicle. The propellant absorbs heat from the tank, the engine, and the fuel lines, and the heat so absorbed is rejected from the propellant in the tank by venting the tank, and allowing the propellant to boil. The continuous flow of cryogenic propellant tops off the tank, and the propellant in the tank remains at a mass density corresponding to the temperature at which the propellant boils.

An improved densification technique is described in U.S. Pat. No. 5,644,920, issued Jul. 8, 1997 in the name of Lak et al. The technique described therein densifies the propellant in order to allow the vehicle to carry more fuel mass in the same tank volume, while reducing the vapor pressure, and consequently lowering the tank operating pressure. The reduction of operating pressure allows the tank wall to be thinner than if the operating pressure were higher, and reduces the vehicle's mass. The reduction in vehicle mass, in turn, improves the payload capacity of the vehicle.

As described in the abovementioned Lak et al. patent, the cryogenic propellant can be supercooled well below the normal boiling point temperature by transporting the liquid propellant from the vehicle tanks to a ground-based cooling unit which uses a combination of a heat exchanger and compressor. The compressor lowers the coolant fluid bath pressure, resulting in a low-temperature boiling liquid in the heat exchanger, which is subsequently used to cool the propellant. The cooled propellant is returned to the vehicle propellant tank. As described in the Lak patent, the scheme described therein has the additional advantages of elimination of an on-board recirculation pump or bleed system, smaller and lighter engine pumps and valves, a more stable ullage gas, and reductions in tank fill operations.

Improved propellant densification is desired.

SUMMARY OF THE INVENTION

A method according to the invention for densifying propellant of a vehicle includes the step of providing a heat exchanger including a chamber, a heater located within the chamber, and a cooler also located within the chamber at a position higher than the heater. The heater includes a path for the flow of fluid from a first or input port to a second or output port, and through the chamber. The path of the heater is closed, or isolated from the chamber so that fluid in the path of the heater cannot co-mingle with fluid or bath in the chamber as the fluid in the path of the heater moves from the first port to the second port of the path of the heater. The cooler also includes a path for the flow of fluid extending through the chamber from a first or input port to a second or output port. The path of the cooler is isolated from the chamber so that fluid in the path of the cooler cannot co-mingle with fluid in the chamber as the fluid in the path of the cooler moves from the first port to the second port of the path of the cooler. The method further includes the step of pumping propellant from the vehicle to the first port of the path of the heater, to thereby create a flow of propellant through the heater path, and from the second port of the path of the heater. In conjunction with the pumping, propellant is coupled from the second port of the heater back to the vehicle, to thereby establish a recirculating flow of propellant. The chamber of the heat exchanger is filled with at least sufficient cryogenic liquid to cover at least a portion of the path of the cooler, and preferably the entirety of the path of the cooler. A cryogenic fluid is boiled, to thereby cool the cryogenic fluid, and the resulting cooled cryogenic fluid is flowed through the path of the cooler. As a result, or whereby, the flow of the cooled cryogenic fluid through the cooler cools the cryogenic liquid, and the cryogenic liquid cools the heater by convection. When the cryogenic liquid cools the heater, the cryogenic propellant flowing through the heater gives up heat to the cryogenic liquid and becomes cooler, thereby densifying the cryogenic propellant.

In a particular mode of the method, the cryogenic liquid is liquid nitrogen. In a most preferred mode of the method, the cryogenic propellant is liquid oxygen, and the cryogenic fluid is hydrogen.

DESCRIPTION OF THE INVENTION

Figure 1:
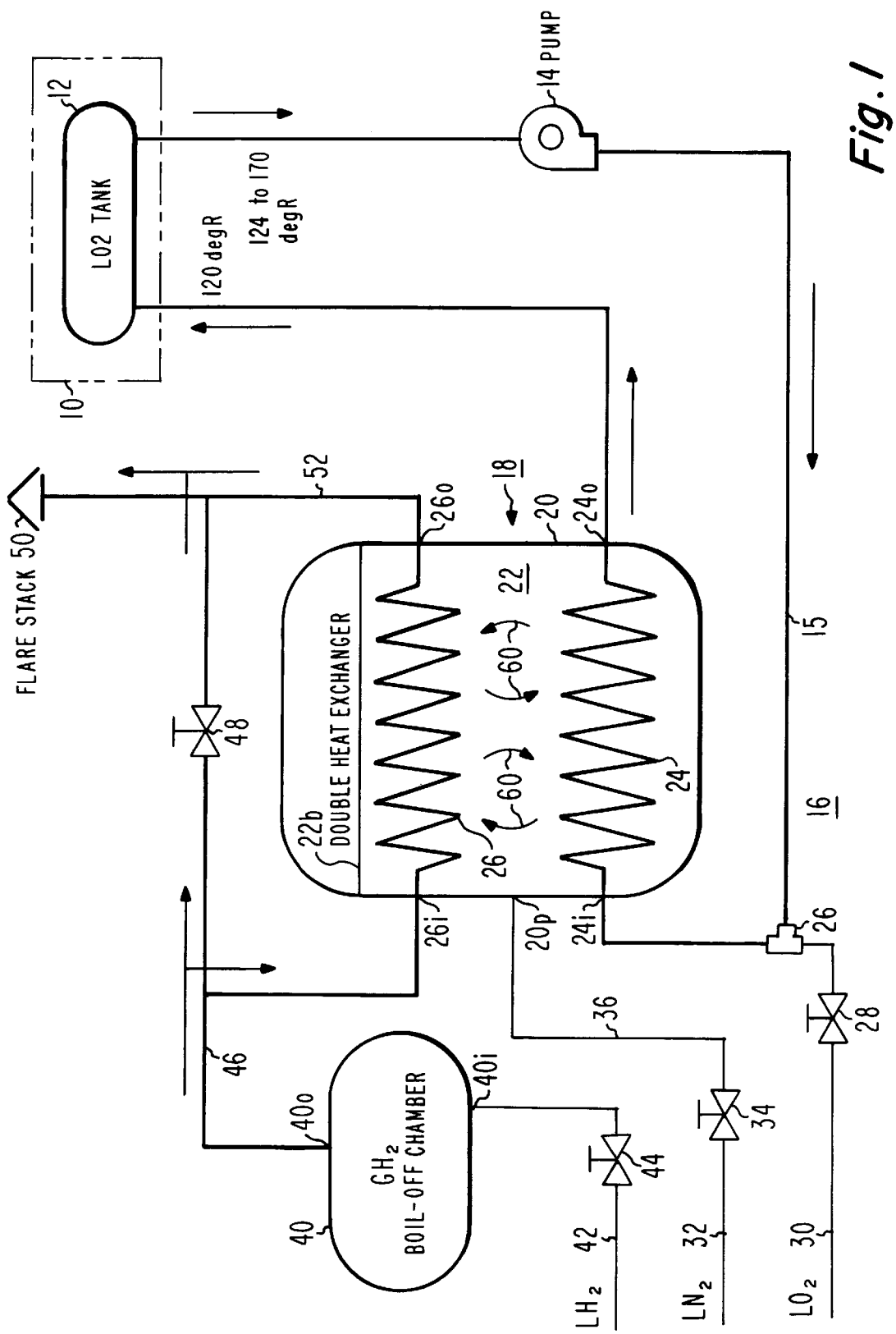
FIG. 1 is a simplified schematic diagram of an apparatus which may be used in conjunction with a method in accordance with an aspect of the invention.

In FIG. 1, a launch vehicle 10 includes an on-board propellant tank 12, which is illustrated as a liquid oxygen (LO2) tank. Liquid oxygen is a cryogenic propellant. As described in the Lak et al patent, the cryogenic propellant is pumped from the on-board tank 12 by a pump 14 to a cooler or densifier designated generally as 16.

Densifier 16 of FIG. 1 includes a double heat exchanger 18 including a chamber wall 20 defining an interior chamber 22 which can be filled through a fill port 20p. Heat exchanger 18 also includes a first "heater" pipe or coil 24 which defines a closed path for the flow of fluid from a first or "input" port 24i to a second or "output" port 24o. Heater pipe 24 is illustrated as being located in a lower section of the chamber 22. Heat exchanger 18 also includes a "cooler" pipe or coil 26, which is located in an upper section of chamber 22. Cooler pipe 26 provides a closed path for the flow of fluid from an "input" port 26i to an "output" port 26o. Fluid flowing in heater pipe 24 cannot co-mingle with the fluid in chamber 22, and, similarly, fluid flowing in cooler pipe 26 cannot co-mingle with the fluid in chamber 22.

The cryogenic propellant, which is liquid oxygen in the illustrative example, which is provided in FIG. 1 to densifier 16 from pump 14 is applied by way of a pipe 15 to input port 24i of heater pipe 24, and flows through the heater pipe to output port 24o. From output port 24o, the cryogenic propellant is routed back to the propellant tank 12 of vehicle 10.

In order to fill the tank 12 of vehicle 10 with cryogenic propellant in the form of liquid oxygen, a source of liquid oxygen (not illustrated in FIG. 1) is connected by way of a pipe 30 and a valve 28 to a tee junction 26 in pipe 15, downstream from pump 14.

A cryogenic liquid, which in the example illustrated in FIG. 1 is liquid nitrogen (LN2) is provided to fill port 20p of chamber 22 by way of a pipe 32, a valve 34, and a further pipe 36 from a source (not illustrated) of liquid nitrogen.

In FIG. 1, a boiler 40 includes a fill port 40i and an exit port 40o. A cryogenic fluid, which in the example is liquid hydrogen (LH2), is provided to fill port 40i from a source (not illustrated) by way of a pipe 42 and a valve 44. A first pipe 46 connects output port 40o of boiling chamber 40 to a valve 48 and to input port 26i of cooler pipe 26. A flare stack 50 is connected by way of a pipe 52 to valve 48 and to output port 26o of cooler pipe 26. The cryogenic fluid is exposed to ambient pressure by way of either, or both, of two paths, the first extending through valve 48 to a flare stack 50, and the second extending through cooler pipe 26 to the flare stack 50.

The liquid oxygen in tank 12 of vehicle 10 is densified by operating pump 14, to thereby pump the propellant through the pipe or coil 24. In pipe 24, the liquid oxygen propellant loses heat to the liquid nitrogen bath (the liquid level of which is illustrated as 22b in FIG. 1) in surrounding chamber 22, and heats the liquid nitrogen bath, becoming cooler in the process. The boiling liquid hydrogen in boiling chamber 40 produces supercooled fluid, which flows through cooler pipe 26 when valve 48 is closed. The supercooled hydrogen fluid flowing through cooler pipe 26 cools the upper levels of the liquid nitrogen bath 22b. With the upper levels of the liquid nitrogen bath 22b cooled and the lower levels heated, thermally-induced convection currents, illustrated by curved arrows 60 of FIG. 1, are set up in the heat exchanger bath 22b, which provides good thermal coupling between the coolant fluid in cooling pipe 26 and the cryogenic liquid propellant flowing in heater pipe 24.

Other embodiments of the invention will be apparent to those skilled in the art. For example, while the paths for the flow of fluid through the chamber 22 have been described as pipes or coils, those skilled in the art know that many shapes of pipes or manifolds may be used instead of ordinary round cross-section pipes, with an attendant increase of surface area. While the method of the invention has been described only in conjunction with liquid oxygen propellant, it may be used with any propellant, and may be applied individually to each of various different types of propellant which may be carried on a vehicle.

Thus, a method for densifying the propellant (LO2) of a vehicle (10) includes the step of providing a heat exchanger (16) including a chamber (22), a heater (24) located within the chamber (22), and a cooler (26) also located within the chamber (22) at a position higher than the heater (24). The heater (24) includes a path for the flow of fluid from a first or input port (24i) to a second or output port (24o), and through the chamber (22). The path of the heater (24) is closed, or isolated from the chamber (22) so that fluid in the path of the heater (24) cannot co-mingle with fluid or bath in the chamber (22) as the fluid in the path of the heater (24) moves from the first port to the second port of the path of the heater (24). The cooler (26) also includes a path for the flow of fluid extending through the chamber (22) from a first or input port (26i) to a second or output port (26o). The path of the cooler (26) is isolated from the chamber (22) so that fluid in the path of the cooler (26) cannot co-mingle with fluid in the chamber (22) as the fluid in the path of the cooler (26) moves from the first port (26i) to the second port (26o) of the path of the cooler (26). The method further includes the step of pumping (with pump 14) propellant (LO2) from the vehicle (10) to the first port (24i) of the path of the heater (24), to thereby create a flow of propellant (LO2) through the heater (24) path, and from the second port (24o) of the path of the heater (24). In conjunction with the pumping, propellant (LO2) is coupled from the second port (24o) of the heater (24) back to the vehicle (10), to thereby establish a recirculating flow of propellant (LO2). The chamber (22) of the heat exchanger (16) is filled with at least sufficient cryogenic liquid (LN2) to cover at least a portion of the path of the cooler (26), and preferably the entirety of the path of the cooler (26). A cryogenic fluid (LH2) is boiled, to thereby cool the cryogenic fluid, and the resulting cooled cryogenic fluid is flowed through the path of the cooler (26). As a result, or whereby, the flow of the cooled cryogenic fluid through the cooler (26) cools the cryogenic liquid (LN2), and the cryogenic liquid (LN2) cools the heater (24) by convection (60). When the cryogenic liquid (LN2) cools the heater (24), the cryogenic propellant (LO2) flowing through the heater (24) gives up heat to the cryogenic liquid and becomes cooler (26), thereby densifying the cryogenic propellant (LO2).

In a particular mode of the method, the cryogenic liquid is liquid nitrogen (LN2). In a most preferred mode of the method, the cryogenic propellant (LO2) is liquid oxygen, and the cryogenic fluid is hydrogen.

What is claimed is:

1. A method for densifying the propellant of a vehicle, said method comprising the steps of:

providing a heat exchanger including a chamber, a heater located within said chamber, and a cooler also located within said chamber, at a position higher than said heater, said heater comprising a path through said chamber for the flow of fluid, said path of said heater being isolated from said chamber so that fluid in said path of said heater cannot co-mingle with fluid in said chamber as said fluid in said path of said heater moves from a first port to a second port of said path of said heater, said cooler also comprising a path through said chamber for the flow of fluid, said path of said cooler being isolated from said chamber so that fluid in said path of said cooler cannot co-mingle with fluid in said chamber as said fluid in said path of said cooler moves from a first port to a second port of said path of said cooler;

pumping propellant from said vehicle to said first port of said path of said heater, to thereby create a flow of propellant from said second port of said path of said heater;

coupling propellant from said second port of said heater back to said vehicle, to thereby establish a recirculating flow of propellant;

filling said chamber of said heat exchanger with at least sufficient cryogenic liquid to cover at least a portion of said path of said cooler;

boiling a cryogenic fluid to thereby cool said cryogenic fluid, and flowing cooled cryogenic fluid through said path of said cooler, whereby said flow of said cooled cryogenic fluid through said cooler cools said cryogenic liquids, and said cryogenic liquid cools said heater by convection, whereby said cryogenic propellant flowing through said heater gives up heat to said cryogenic liquid and becomes cooler, thereby densifying said cryogenic propellant.

2. A method according to claim 1, wherein said cryogenic liquid is liquid nitrogen.

3. A method according to claim 1, wherein said cryogenic propellant is liquid oxygen, and said cryogenic fluid is hydrogen.

4. A method according to claim 3, wherein said cryogenic liquid is liquid nitrogen.

* * * * *